No. 770,976. Patented September 27, 1904.

UNITED STATES PATENT OFFICE.

NÉSTOR LÓPEZ, OF DELRIO, TEXAS.

BOILER-CLEANING COMPOUND.

SPECIFICATION forming part of Letters Patent No. 770,976, dated September 27, 1904.

Application filed July 27, 1904. Serial No. 218,393. (No specimens.)

*To all whom it may concern:*

Be it known that I, NÉSTOR LÓPEZ, a citizen of the United States of America, residing at Delrio, in the county of Valverde and State of Texas, have invented certain new and useful Improvements in Boiler-Cleaning Compounds, of which the following is a specification.

This invention relates to steam-boilers and furnaces, and particularly to a device for preventing incrustation which results from the use of hard water and other causes.

An object of this invention is to produce a liquid which may be fed to the boiler through the ordinary injector or applied in any other well-known way in order that it may come in contact with the affected surface.

The invention consists in the ingredients and proportions combined in the following manner, viz: water, one gallon; *Covillea divaricata*, (greasewood or creosote-brush,) one-half pound. The foregoing ingredients are boiled until two-thirds of the water has evaporated and the remainder forms one of the extracts. Water, one gallon; *Phragmites phragmites*, (reed,) four ounces; *Yucca Sp.*, (soap-tree,) four ounces. These last-named ingredients are boiled in the water until one-half of the water has evaporated, and this extract will form the other ingredient of the composition. The final step in making the cleaning compound involves the mixing of eight ounces of the first-named extract with two ounces of the last-named extract, which proportion is found to be efficient for ordinary use in cleaning engines, boilers, and other vessels.

It has been found in practice that where the boiler has become foul the first application of the compound should be five gallons of the mixture for a boiler of one hundred horse-power, and thereafter the application of two and one-half gallons will be required for cleaning, and the frequency of application will depend upon the water and other conditions of use.

Other vessels than steam-boilers may be cleaned by placing the mixture therein while water is being boiled, and the effect of the use of the mixture is to cause the matter that collects in the boiler or about the flue to fall from the sides.

The proportions, it will be understood, may be variously modified to suit particular requirements, and the mode of application may be changed at the will of the user, and I therefore do not wish to be limited in this respect.

Having fully described the invention, what I claim as new, and desire to secure by Letters Patent, is—

In a compound for cleaning boilers an extract of *Covillea divaricata* and an extract of *Phragmites phragmites*, and *Yucca* combined substantially as specified.

In testimony whereof I affix my signature, in the presence of two witnesses, this 23d day of July, 1904.

NÉSTOR LÓPEZ.

Witnesses:
JOSEPH JONES,
CHARLES MILLER.